(No Model.)
W. L. CHENEY.
SCALE FOR MEASURING GAS PIPE AND FITTINGS.
No. 344,721. Patented June 29, 1886.
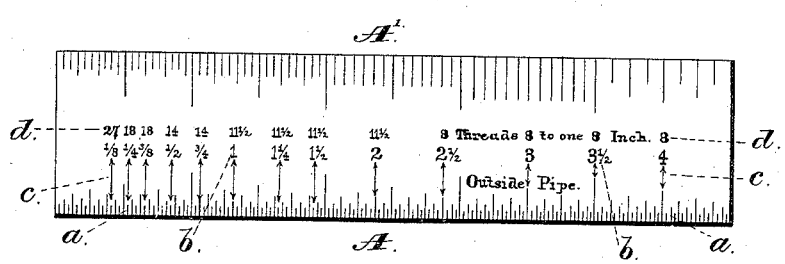
Witnesses:
Jas. E. Hutchinson.
Henry C. Hazard.
Inventor.
Walter L. Cheney
by Prindle and Russell
his Attorneys.

United States Patent Office.

WALTER L. CHENEY, OF PHILADELPHIA, PENNSYLVANIA.

SCALE FOR MEASURING GAS PIPE AND FITTINGS.

SPECIFICATION forming part of Letters Patent No. 344,721, dated June 29, 1886.

Application filed March 10, 1886. Serial No. 194,732. (No model.)

*To all whom it may concern:*

Be it known that I, WALTER L. CHENEY, of Philadelphia, in the county of Philadelphia, and in the State of Pennsylvania, have invented a certain new and useful Improved Scale; and I do hereby declare that the following is a full, clear, and exact description thereof, reference being had to the accompanying drawing, in which is shown a plan view of my improved scale.

The object of my invention is to provide an improved scale by which pipe and fittings can be correctly measured at one operation, and the number of threads to the inch for the size measured can be determined; and to this end my invention consists in the scale arranged, divided, graduated, and marked as hereinafter specified.

The method of determining the size of fittings for steam and gas pipes, or of the inside of the pipe itself when such inside was not accessible, has been to first measure the outside of the pipe or the inside of the fitting as tapped, then to compare the measurement so obtained with a table of sizes, and from this, or from memory, get the equivalent inside diameter of the pipe. The first measurement of the pipe, which is usually made with a rule or scale, only approximates the true size of the pipe or fitting. Each one of the steps in the method, as heretofore practiced, is liable to error. To avoid the loss of time and the possibilities of errors arising from the use of such method, I have invented the scale shown in the drawing. Such scale is preferably five inches long and made of metal, though neither the length nor the material is an essential feature of my invention.

Of the two longitudinal edges A and A', the one, A, is provided with a series of the ordinary graduation-marks, dividing its length into inches and fractions thereof down to thirty-seconds, as in ordinary scales or rules. The opposite edge, A', is also divided by graduation-marks into inches; but the different inch-spaces are subdivided into different numbers of divisions, as will be described more fully hereinafter.

The ordinary series of graduations, $a$, along the edge A are preferably to be numbered and marked in the manner usual in rules or scales. Over these graduations $a$ is a series of figures, $b$, representing consecutively the inside diameters of a number of different-sized pipes. The inch divisions or spaces on the scale $a$ are preferably divided into thirty-two parts, so as to secure graduation of such fineness that the graduation-mark nearest to the exact theoretical outside diameter of a pipe shall not vary from said theoretical diameter more than the actual diameter of the pipe would vary. Such graduation and division is ordinarily found sufficiently fine, but on steel or metal scales the divisions can be made even finer, if desired.

Each of the numbers or figures in series $b$ is connected by mark or line $c$, as shown, with the graduation on scale $a$ which is nearest to the exact theoretical outside diameter of the pipe, which should have an inside diameter of the size indicated by the number or figure; or, in other words, the graduations of series $a$ which are nearest to the exact theoretical outside diameters of the various sizes of pipes are connected by lines or marks $c$, to assist the eye, with the respective numbers or figures of series $b$ which indicate or represent the corresponding inside diameters of pipe.

Above the series of numbers or figures $b$ is a second series of figures or numbers, $d$, correspondingly arranged, indicating the proper numbers of threads for the different sizes of pipe. As shown, each of these numbers or figures indicating the threads for a particular size of pipe, is arranged directly over and close to the number or figure indicating the inside diameter for such pipe, so that the reading can be made easily, quickly, and without chance of mistake.

The row or series of figures $d$ is more particularly for use by draftsmen.

The inch-spaces along the opposite edge, A', of the scale are divided into different numbers of parts according to the different numbers of threads per inch used in threading pipe. Thus, beginning at the left, said spaces are divided into twenty-seven, eighteen, fourteen, eleven and one-half, and eight parts, respectively, such numbers representing the different numbers of threads per inch and corresponding with those in the series of numbers $d$ on the scale.

The scale along edge A', divided as described, can obviously be used most advantageously and with the greatest convenience by the draftsman when he wishes to represent threaded pipe, for he can then transfer the proper divisions to his drawing.

A proper explanation of each row of figures, and, if desired, of each series or row of graduations, is to be marked on the scale. Any desired kind of mark, line, or other means for connecting the numbers indicating the various inside diameters with the proper divisions of series of graduations $a$ can be used to aid the eye in properly reading the scale.

If a wooden scale be used instead of a steel or metal one, if the edge A be divided into sixteenths of an inch, the graduation will be fine enough for most uses to which the scale would be likely to be put in working around pipes and fittings. If desired, the nearest graduations to the exact theoretical outside diameter of two or three of the smaller sizes of pipe could then be indicated by a graduation-mark between the one-sixteenth marks. Of course, where desired, other units of linear measurement than inches can be used without departure from my invention.

The method of using my improved scale, as shown and described, is briefly as follows: The outside diameter of the pipe, or inside diameter of the fitting, is measured by the graduations along edge A, and the marked division in such series of graduations which is nearest to such diameter is taken as the exact theoretical diameter of the pipe or fitting. The inside diameter will then at once be shown by the number or figure in series $b$, which is connected by mark C with such marked division. Where it is desired to ascertain the proper number of threads to the inch for any size of pipe or fitting, that number in series $d$ which is directly above graduation-mark indicating the nearest exact theoretical diameter will give the proper number of threads at once. The number of threads to the inch being thus found, the draftsman can transfer the proper division of an inch to the drawing directly from the graduations along edge A', as already indicated herein.

Having thus fully set forth the nature and merits of my invention, what I claim is—

1. As an article of manufacture, a scale having a series of graduations of linear measurement, a series of numbers or figures indicating the inside diameters of various sizes of pipe, and means for connecting the different numbers or figures with the graduations of linear measurement which are nearest to the exact theoretical outside diameters of the various sizes of pipe, substantially as and for the purposes described.

2. As an article of manufacture, a scale having a series of graduations of linear measurement, a series of figures indicating the inside diameters of several different sizes of pipe, suitable marks indicating the graduations of linear measurement which are nearest to the exact theoretical outside diameter of several different sized pipes, and suitable lines or marks connecting such graduations with the corresponding figures indicating the inside diameters of such pipes, substantially as set forth, for the purpose specified.

3. As an article of manufacture, a scale having along one edge a series of graduations of linear measurement, means for indicating the graduations nearest to the exact theoretical outside diameters of different sizes of pipe, and a series of numbers indicating the proper interior diameters of the different-sized pipes arranged over the respective indicated graduation-marks, substantially as shown and described.

4. As an article of manufacture, a scale having a series of graduations of linear measurement, a series of numbers indicating the inside diameters of different sizes of pipe, suitable marks or lines connecting each of such numbers with the graduation of linear measurement which is nearest to the exact theoretical diameter of a pipe having the internal diameter indicated by such number, and a series of numbers indicating the numbers of threads to the inch for the different sizes of pipe, substantially as and for the purposes described.

5. As an article of manufacture, a scale provided with a series of numbers indicating the number of threads to the inch to be used for pipes of different sizes, and a series of inch-graduations having the inch-spaces divided into different numbers of divisions corresponding with the different numbers in the series on the scale, substantially as shown, for the purpose set forth.

6. As an article of manufacture, a scale having the series of graduations of linear measurement $a$ along one edge, the series of numbers $b$, indicating the different inside diameters of pipes, suitable marks for indicating the graduations of linear measurement which are nearest the exact theoretical diameters of different-sized pipes and connecting the different numbers in series $b$ with such graduations, a series of figures, $d$, giving the number of threads to the inch for the different-sized pipes, and a series of inch-graduations along its other edge, in which the different inch-spaces are divided into parts corresponding with the different numbers in the series, substantially as and for the purposes set forth and described.

In testimony that I claim the foregoing I have hereunto set my hand this 21st day of January, A. D. 1886.

WALTER L. CHENEY.

Witnesses:
 JAS. B. GAITHER,
 D. KINGHORN.